United States Patent

Taylor

[11] 3,839,074
[45] Oct. 1, 1974

[54] OPAQUE COMPOSITE FILM
[75] Inventor: John S. Taylor, Newark, Del.
[73] Assignee: FMC Corporation, Philadelphia, Pa.
[22] Filed: Aug. 18, 1972
[21] Appl. No.: 281,845

[52] U.S. Cl. ............... 117/68, 106/193 J, 117/145, 117/160 R
[51] Int. Cl. ............................................. B05c 9/04
[58] Field of Search ............ 106/193 J; 117/28, 145, 117/160 R, 68

[56] References Cited
UNITED STATES PATENTS

| | | | |
|---|---|---|---|
| 2,057,712 | 10/1936 | Dreyfus | 18/54 |
| 2,440,094 | 4/1946 | Israel | 106/166 |
| 2,868,663 | 1/1959 | Jarmus et al. | 106/193 J |
| 2,990,291 | 6/1961 | Bartholomay | 106/193 X |
| 3,053,676 | 9/1962 | Higbee | 106/193 X |
| 3,428,483 | 2/1969 | Owens | 117/145 |
| 3,663,275 | 5/1972 | Owens | 106/193 X |

Primary Examiner—William D. Martin
Assistant Examiner—M. R. Lusignan

[57] ABSTRACT

A composite film comprised of a layer of regenerated cellulose which has incorporated therein a titanium dioxide pigment and which is coated along opposite sides thereof with a film-forming thermoplastic resin, with at least one of such coatings containing an aluminum pigment. The titanium dioxide and aluminum pigments together cooperate to reduce the transmission of light through the composite film.

10 Claims, 1 Drawing Figure

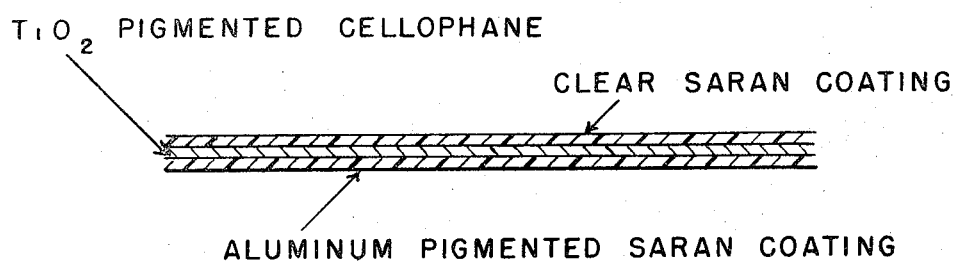

OPAQUE COMPOSITE FILM

The present invention relates to composite films, and particularly, composite films containing regenerated cellulose, having reduced light transmission characteristics.

Known in the art are transparent regenerated cellulose films which extend the keeping time or shelf life of packaged oil-containing food products, such as potato chips, crackers, cakes, butter, candies and nuts. For example, in an article appearing in Industrial and Engineering Chemistry, Vol. 27, No. 11, pages 1287–1290, dated November 1935, Willard L. Morgan points out that light is often the prominent factor in the rapid development of oxidation rancidity of oily products. In this publication much data is provided in support of the author's conclusion that light transmitted through transparent regenerated cellulose films which are blue in color has an accelerating effect in causing rancidity of oil-containing food products, while no such accelerating effect is evident when such products are packaged in like transparent regenerated cellulose films which are yellow or red in color.

Presently available to the packaging industry are decorative white regenerated cellulose films which have the brightness and gloss of transparent regenerated cellulose films and which are described as being "opaque". Such white regenerated cellulose films, however, do permit the passage of about 40 percent of visible light and are therefore not entirely satisfactory for use with oil-containing food products.

Composite films, formed by depositing a coating of aluminum onto a surface of a transparent regenerated cellulose layer by conventional vacuum metallizing techniques, are quite effective in extending the keeping qualities of oil-containing food products. However, vacuum metallizing procedures are expensive, generally costing several dollars for each pound of regenerated cellulose which is treated and making such procedures economically impractical. More significant vacuum metallized surfaces are not heat-sealable, which is an essential requirement of the films to which the present invention pertains. Thus, in the article packaging field, such metallized films would find little use if they are not provided, at still further expenses, with suitable thermoplastic coatings.

A primary object of this invention is to provide a new or generally improved and more satisfactory composite film.

Another object is the provision of a composite heat-sealable film having improved light obstructing properties.

Still another object is the provision of an opaque composite film containing both titanium dioxide and aluminum pigments.

A further object is to provide an opaque composite film, which includes a layer of regenerated cellulose, for use in wrapping oil-containing food products, which film has improved rancidity retarding properties.

A still further object is to provide an improved heat-sealable, opaque composite film which may be easily and economically produced and which is acceptable for use with food products.

The single FIGURE of the drawing illustrates the composite film of the present invention.

These and other objects of the invention are accomplished in accordance with the present invention by an opaque composite film which is comprised of a layer of regenerated cellulose (cellophane) having incorporated therein a pigment of titanium dioxide and which is coated along each of the opposite sides with a thermoplastic film-forming resin. At least one and, as shown in the drawing, preferably only one of the applied thermoplastic coatings has uniformly dispersed therein an aluminum pigment.

In the preferred embodiment of the present invention from about 8.0 to 15.0 percent of titanium dioxide, based upon the weight of cellulose and pigment, is contained in the regenerated cellulose layer, and from about 5 to 20 parts per hundred (phr), and ideally about 10 phr, of aluminum is present in the coating of thermoplastic resin.

The composite films of the present invention, being opaque yet decorative, are adapted for use in packaging of a variety of different articles. Such composite films, however, are especially suited for use in packaging of oil-containing products, with the film opacity serving to shield the packaged products from light and thereby improving the keeping or freshness thereof.

As understood in the art, the terms "opaque" and "opacity" are both employed in a relative sense as referring to films which permit only a partial transmission of visible light and substantially less than that which is transmitted through transparent or translucent films. Further, for simplicity and ease of description, concentrations of titanium dioxide in the regenerated cellulose layer are expressed herein as percentages, it being understood that such percentages are based upon the total weight of the cellulose and titanium dioxide present in such layers.

The regenerated cellulose layer of the composite film of the present invention is produced by simply incorporating the titanium dioxide pigment into a film-forming viscose solution and then extruding such solution through an elongated die orifice and into a coagulating medium. Film-forming viscose solutions are well known and, in general, are formed by reacting carbon disulfide with alkali cellulose and then mixing the resulting sodium cellulose xanthate with dilute sodium hydroxide. Coagulating mediums for such viscose solutions include hot inert gases, aqueous acid baths, aqueous baths containing phosphate ions, etc. Typical coagulating baths include 62 percent water, 13 percent sulfuric acid and 25 percent sodium sulfate, or 47 percent water, 36 percent phosphoric acid and 17 percent sodium hydroxide. The viscose solution is at least partially regenerated during passage through the coagulating medium and, if desired, may be passed through more than one coagulating medium.

After coagulation, the wet gel cellulose layer may be wet processed and then plasticized, usually by passage through an aqueous bath containing the plasticizing compound. Plasticizers for such cellulosic layer are well known and include, for example, glycerine, urea, propylene glycol and polyethylene glycols of various molecular weights.

An anchoring material is incorporated in the regenerated cellulose layer at least along the surfaces thereof to provide for improved adhesion between such layer and the coatings of thermoplastic film-forming resins which are to be subsequently applied thereto. Advantageously, a water-miscible or water-soluble anchoring agent is incorporated in the plasticizing bath and is incorporated in the regenerated cellulose layer during passage of this layer through the plasticizing bath. Conventional of such anchoring agents include, for example, melamine-formaldehyde precondensates, urea-formaldehyde precondensates and polyalkyleneimines.

The incorporation of titanium dioxide in regenerated cellulose layers is well known with generally from about 8 to 12 percent of titanium dioxide being employed in conventional white regenerated cellulose films. In such films reducing or increasing the amount of titanium dioxide from the range mentioned provides, on the one hand, a white regenerated cellulose film which is of reduced opacity and, on the other hand, a white regenerated cellulose film which exhibits a definite sacrifice in certain of its physical properties without any significant improvement in its light obstructing characteristics.

Either anatase or rutile titanium dioxide may be employed in the manufacture of the films of the present invention, with the latter being preferred in view of its better hiding power per unit weight. Rutile forms of titanium dioxide which are suitable include Titanox 2055, which is predispersed, and Titanox 2015, both of which are produced by the Titanium Pigment Division of N.L. Industries. The titanium dioxide may be present in amounts equal to or greater than that as is normally employed in conventional white regenerated cellulose films and serves to supplement the opacity, as well as to temper any darkening which may be imparted to the resulting composite film by the aluminum contained in the applied thermoplastic coating.

In the production of the regenerated cellulose layer of the composite film of the present invention, the titanium dioxide employed is in finely comminuted form and is dispersed in a suitable carrier. For example, an aqueous dispersion containing 70 percent titanium dioxide, such as Titanox 2015, may be provided using a high shear mixer and about 0.2 percent of sodium tripolyphosphate as a dispersant. Prior to use, such dispersion may be diluted to a desired concentration and is injected into and mixed with the film-forming viscose solution immediately prior to its passage through an extrusion nozzle. Normally, the average size of the titanium dioxide particles is about 0.2 to 0.3 micron and thus no extraordinary techniques or equipment are required in the extrusion process. Moreover, notwithstanding the strong caustic acid and bleaching mediums used in the production of these pigmented regenerated cellulose layers, no bleeding of the titanium dioxide pigment is experienced in the manufacture of such layers.

The pigmented regenerated cellulose layer is dried after is formation and is coated along opposite sides thereof with a lacquer or volatile organic solvent solution of a film-forming thermoplastic resin. Principal film-forming thermoplastic resins useful for such coating purposes include vinyl chloride homopolymers and copolymers, vinylidene chloride copolymers (sarans) and nitrocellulose.

Resins of vinyl chloride polymers include homopolymer and copolymers predominantly of vinyl chloride and a copolymerizable monomer or monomers. Such examples of copolymerizable monomers include vinyl acetate, vinyl propionate, vinyl isobutyl ether, alkyl esters of acrylic and methacrylic acid, ethylene, propylene, maleic acid or its anhydride, and the like.

Lacquers are prepared by dissolving the vinyl resin or resin mixture in a volatile organic solvent at a solids concentration of from about 5 to about 25 percent. Some of the useful solvents and diluents for the lacquer include ethyl acetate, butyl acetate, acetone, methyl ethyl ketone, methyl alcohol, butyl alchohol, ether-alcohols, heptane, benzene, xylene, toluene, and mixtures of these. The vinyl resin lacquer may also contain various additives to improve the coating properties including, for example moisture-proofing agents, vegetable oil lubricants, slip agents, blending agents, and the like.

The saran or vinylidene chloride copolymer resin includes copolymers predominantly of vinylidene chloride with a copolymerizable monomer or monomers. The copolymerizable monomers include, for example, acrylonitrile, vinyl chloride, acrylic and methacrylic acid, alkyl esters of these acids, itaconic acid, and those additional monomers mentioned above for the vinyl chloride polymers.

Lacquers of the vinylidene chloride copolymer resins are prepared with solvents including, for example, tetrahydrofuran, methylethyl ketone, and the like. Diluents such as toluene, xylene and benzene may also be employed in the lacquer.

As in the case of the vinyl resin lacquer, the saran lacquer may contain additives to improve the coating properties including slip agents, waxes and the like.

Nitrocellulose lacquers are also well known and typical nitrocellulose coating compositions may be seen in U.S. Pat. Nos. 2,888,368 and 2,950,992. Plasticizers, moistureproofing agents, blending agents and other additives are often included in the composition. Solvents include hydrocarbons, ketones, alcohols, ethers and mixtures of these organic liquids.

Other suitable thermoplastic film-forming resin coating materials will be readily known to those skilled in this art.

The thermoplastic resin coating materials are deposited onto the regenerated cellulose layer using conventional coating techniques, with the resin itself which is applied to one side of such layer being like or different from that applied onto the opposite side thereof. While an aluminum pigment may be contained within both of such coatings, it is preferred that such pigment be incorporated in only one such coatings, and preferably only that coating which is to comprise the inside surface of an article package. In such composite film construction, not only can full advantage be made of the highly attractive printable surface of the white regenerated cellulose layer, but the aluminum pigmented surface itself exhibits an appearance which is much lighter and decorative than that which results when an aluminum pigment is applied to a corresponding transparent regenerated cellulose layer.

The aluminum pigment which is incorporated into the thermoplastic resin coating material may be in powdered form or, alternatively and preferably, in the form of pastes in which the aluminum pigment is predispersed in mineral spirits. Aluminum, pigments which are satisfactory for use in the present invention are commercially available from the Aluminum Company of America, for example, as dry powders, designated as No. 422, and as pastes, designated as Nos. 1571 and 1573. A complete and uniform dispersion of the aluminum pigment within the thermoplastic resin coating material is achieved by subjecting the combined coating material and aluminum pigment to a high shear mixing action.

As heretofore mentioned, the aluminum pigment present in the coating material may range from 5 to 20phr, and ideally are about 10phr. Concentrations of aluminum pigments of less than about 5 phr provides for a composite film having light obstructing properties which are not significantly different from those provided by a regenerated cellulose layer pigmented with titanium dioxide alone. On the other hand, coatings containing a loading of aluminum pigment in excess of about 20phr provides for some improvement in the moisture vapor transmission rate (MVTR) of the composite film, because of the blocking action of the aluminum platelets, but results in a serious reduction in the heat-sealability of the pigment-containing coating. Aluminum pigment concentrations of aobut 10phr in the thermoplastic coating provide for good opacity and moisture-vapor transmission characteristics in the composite film, and is not accompanied by any apparent sacifice in the heat-sealable properties thereof.

To further illustrate the merits of the present invention, reference is made to the following example.

An aqueous dispersion containing 76 percent titanium dioxide solids (Titanox 2055) was diluted to reduce the pigment solids concentration to 11.0 percent and, by means of a Moyno-pump, was injected into an inline blender where it was mixed with a conventional film-forming viscose solution. Based upon the total weight of the cellulose and titanium dioxide present, the viscose solution contained a concentration of 11.0 percent titanium dioxide and was thereafter extruded in sheet form at a rate of 230 grams per minute. After being passed through conventional liquid coagulating, regenerating, bleach and wash baths, the regenerated cellulose layer was plasticized using an 8.0 percent glycerine bath and 0.10 percent of a melamineformaldehyde precondensate anchoring agent, dried, and then collected at a rate of 16 feet per minute. The resulting film had a thickness of aobut 0.80 mils.

The regenerated cellulose layer which was produced has a luminous transmission of 37.3 percent, as determined in accordance with ASTM method D-1003, using a Gardner Model UX-10 Pivotable-Sphere Hazemeter and a standard light source.

One side of this regenerated cellulose layer was then coated with a clear saran lacquer comprised on 100 parts Dow F-271 resin sold by Dow Chemical Co.; 1.0 part stearic acid; 1.5 parts carnauba wax; 1.2 parts of an English china clay dispersion, in a 70/30 mixture of tetrahydrofuran and toluene to provide a 12.0 percent solution based on the saran solids. The reverse side of the regenerated cellulose layer was coated with a lacquer as described above within which was dispersed 10phr, based on solids, of aluminum pigment, Alcoa Extra Fine Lining Paste No. 1571 (Food Grade). Dispersion of the aluminum pigment within the lacquer was achieved by high shearing mixing in a Waring Blender for one minute. The opposite sides of the regenerated cellulose layer were coated sequentially using a No. 18 (wire gauge size) Meyer rod, and with the lacquer solvents being evaporated in a drying over after each coating operation.

The resulting composite film is illustrated in the drawing and, using the test procedure and equipment as described above, had a luminous transmission of 18.6 percent, substantially one-half of that which was exhibited by the pigmented regenerated cellulose layer alone.

It is to be understood that changes and variations may be made without departing from the spirit and scope of the invention as defined in the appended claims.

I claim:

1. A composite film which is opaque to visible light, said film being comprised of a layer of regenerated cellulose havng incorporated and substantially uniformly dispersed therein not less than 8% of titanium dioxide pigment, based upon the weight of cellulose and pigment, and a continuous coating formed of a film-forming thermoplastic resin adhered to each of the opposite sides of said regenerated cellulose layer with at least one of said coatings having incorporated and substantially uniformly dispersed therein from about 5 to 20 parts per hundred of aluminum pigment.

2. A composite film as defined in claim 1 wherein only one of said coatings has an aluminum pigment incorporated therein.

3. A composite film as defined in claim 2 wherein said regenerated cellulose layer has incorporated therein not more than 15.0 percent of titanium dioxide pigment, based upon the weight of cellulose and titanium dioxide pigment.

4. A composite film as defined in claim 2 wherein said regenerated cellulose layer has incorporated therein from 8 to 15 percent of titanium dioxide pigment, based upon the weight of cellulose and titanium dioxide pigment.

5. A composite film as defined in claim 3 wherein said one coating has incorporated therein about 10 parts per hundred of aluminum pigment.

6. A composite film as defined in claim 3 wherein said film-forming thermoplastic resin is a copolymer of vinylidene chloride and vinyl chloride.

7. A composite film as defined in claim 3 wherein said film-forming thermoplastic resin is nitrocellulose.

8. A composite film as defined in claim 4 wherein said film-forming thermoplastic resin is a copolymer of vinylidene chloride and vinyl chloride.

9. A composite film as defined in claim 4 wherein said film-forming thermoplastic resin is nitrocellulose.

10. A composite film as defined in claim 4 wherein said titanium dioxide is of the rutile form.

* * * * *